C. J. ROWE.
MAGNETIC SWITCHING DEVICE.
APPLICATION FILED MAY 4, 1912.
1,055,802.
Patented Mar. 11, 1913.
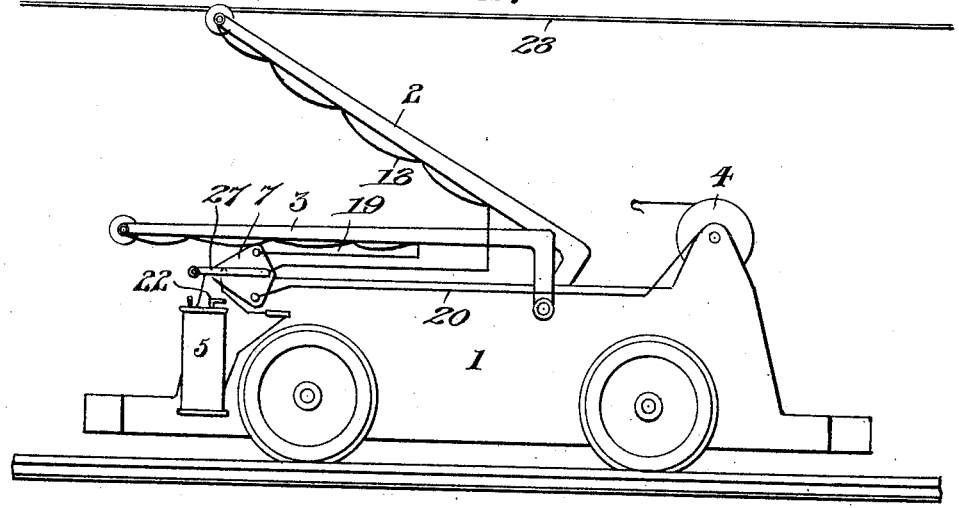
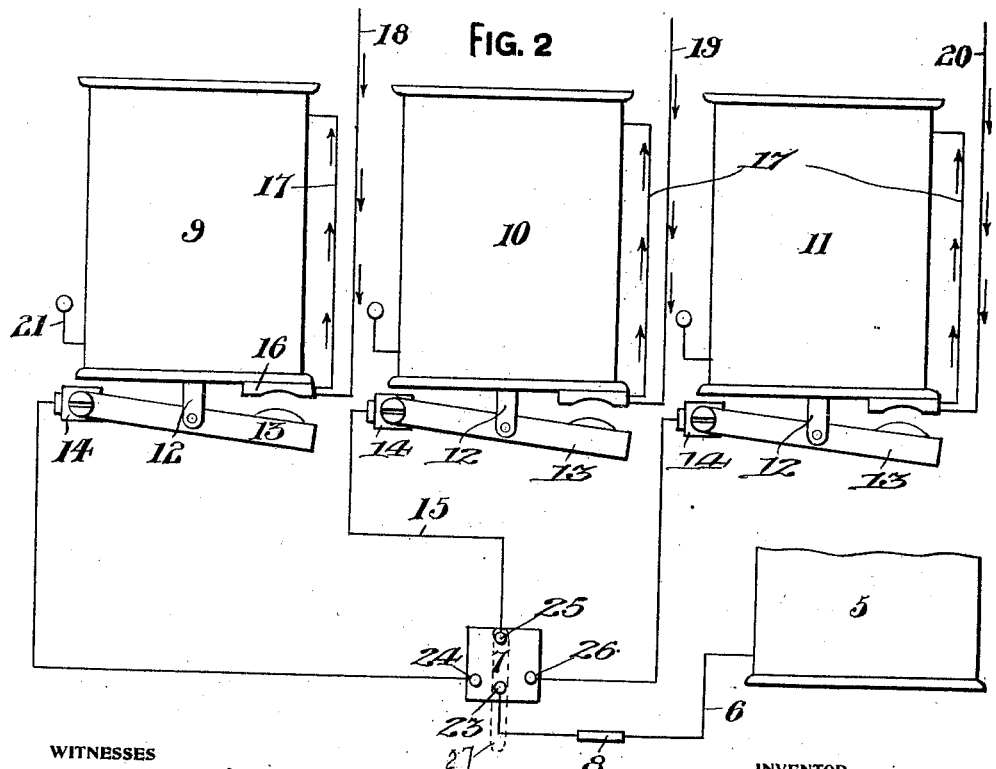
WITNESSES
INVENTOR
Carl J. Rowe
BY
ATTORNEYS

UNITED STATES PATENT OFFICE.

CARL J. ROWE, OF CALIFORNIA, PENNSYLVANIA.

MAGNETIC SWITCHING DEVICE.

1,055,802.  Specification of Letters Patent.  Patented Mar. 11, 1913.

Application filed May 4, 1912. Serial No. 695,133.

*To all whom it may concern:*

Be it known that I, CARL J. ROWE, a citizen of the United States of America, residing at California, in the county of Middlesex and State of Pennsylvania, have invented certain new and useful Improvements in Magnetic Switching Devices, of which the following is a specification, reference being had therein to the accompanying drawing.

This invention relates to a magnetic switching device for use in connection with electric locomotives of industrial railways, more particularly to electric railways for mines and has for its object to provide means carried by the locomotive in a manner as hereinafter set forth for switching the current in one of a plurality of trolley poles or from a reel of wire to the motor controller without necessitating the motor-man leaving the motor.

In order that my invention can be clearly understood, it is thought best to consider conditions as they now exist in the operation of an electric locomotive or a tractor in a mine. A large number of mines throughout the country have installed electric trolley systems and the locomotives or tractors used in connection with these systems are equipped with two trolley poles. This equipment is necessary owing to the fact that a trolley wire will be located in a main mine entry on an opposite side from the trolley wire that is located in a side entry. It is therefore necessary for the operator of the locomotive to change the trolley poles from time to time, consequently the electric circuit in connection with the poles. Furthermore, electric locomotives are equipped with reels containing a flexible conductor that the operator of the locomotive places upon a trolley wire in an entry, whereby the locomotive can enter a room or entry that is not wired. Here again a circuit must be changed and in making these changes, the operator's life is in danger, as the switch contacts are exposed and the hands or limbs are liable to contact with the same. Besides sparking often occurs and this sparking is liable to cause explosion when fire-damp or mine-gases exist.

My invention will be hereinafter specifically described and then claimed, and reference will now be had to the drawing, wherein:—

Figure 1 is a diagrammatic side elevation of an electric locomotive in accordance with this invention, and Fig. 2 is an enlarged diagrammatic view of the switches or magnet coils forming part of the controller.

The reference numeral 1 denotes an electric locomotive having trolley poles 2 and 3, a reel 4 and a controller 5. The controller 5 is connected by a wire 6 to a copper block 7, and a fuse 8 is interposed in the wire 6. Associated with the copper block 7 are magnet coils 9, 10 and 11, these coils being in the form of solenoids that have movable cores 12 pivotally connected to armatures 13. The armatures 13 are pivotally connected to supports 14 and said supports are connected by wires 15 to the copper block 7. The armatures 13 are adapted to engage contact blocks 16 and said blocks are connected by wires 17 to the magnet coils 9, 10 and 11 and by leading out wires 18, 19 and 20 to the poles 2 and 3 and the reel 4 respectively. The coils 9, 10 and 11 have grounding wires 21. The block 7 is provided with contacts 23, 24, 25 and 26 and leading from the contact 23 to the controller 5 is the wire 6. Leading from the contacts 24, 25 and 26 are wires 15 for the magnet coils 9, 10 and 11 respectively. The block 7 is provided with a switch arm 27 electrically connected with the contact 23 and it is utilized to engage in one of the contacts 24, 25 and 26 whereby either one of these contacts will be electrically connected to the contact 23 closing a circuit to the controller.

It will be assumed that the trolley pole 2 is in contact with the trolley wire 28, this will cause the energizing of the magnet coil 9 shifting its armature 13 to engage the contact 16 and if the switching arm 27 is in engagement with the contact 24 the current will be conducted on the contact 16, armature 13, circuit 15, contact 24, lever 27, contact 23, wire 6 to controller 5 from there to motor. If the trolley 2 should be moved from the trolley wire 28 and the wire from the reel 4 connected to the trolley wire 28, the circuit would be from trolley wire 28, reel 4, contact 16, coil 11, armature of said coil, wire 15 leading from said armature, contact 26, switch arm 27, contact 23, wire 6 to controller. It is thought that the circuit for the contact 25 is obvious in view of the foregoing explanation.

When either one of the trolley poles or the reel wire 4 is in engagement with the trolley wire 28, its respective magnet coil is energized, but the current does not flow to the controller 5, unless the switch 27 has been shifted to engage the proper contact carried by the block 7.

What I claim is:—

A magnetic switching device comprising the combination with a plurality of trolleys, a controller and a reel carried by a locomotive, of a block carried by the locomotive, a series of magnetic coils carried by the locomotive and each provided with an armature, a contact carried by each of the coils and associated with and adapted to be engaged by the armature of its respective coil, a circuit wire leading from each contact to its respective coil, circuit wires leading from said trolleys and reel and each connected to one of said contacts, said circuit wires independent of each other, said block provided with a series of contacts, a circuit wire leading from one of the contacts of said block to said controller, circuit wires between the other contacts of said block and said armatures and independent of each other, and an arm for electrically connecting either of said contacts having a wire leading to an armature to that contact having the wire leading to the controller.

In testimony whereof I affix my signature in the presence of two witnesses.

CARL J. ROWE.

Witnesses:
 WALTER STEWART,
 HOWARD COATSWORTH.

Copies of this patent may be obtained for five cents each, by addressing the "Commissioner of Patents, Washington, D. C."